March 1, 1932.  H. GILLIES  1,847,714
BRAKE DRUM
Filed Feb. 11, 1929  2 Sheets-Sheet 1
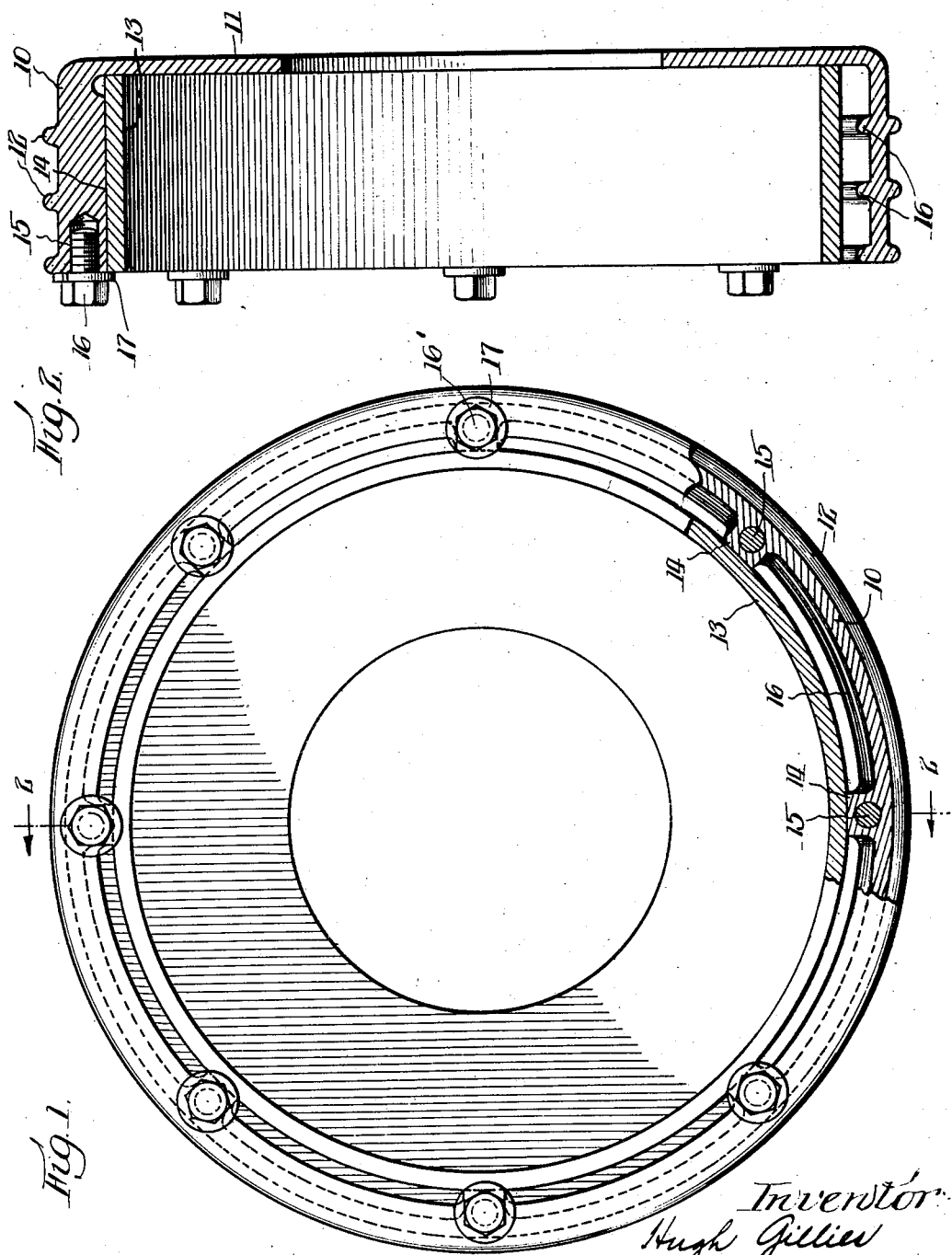
Inventor
Hugh Gillies
By Wm. O. Belt atty.

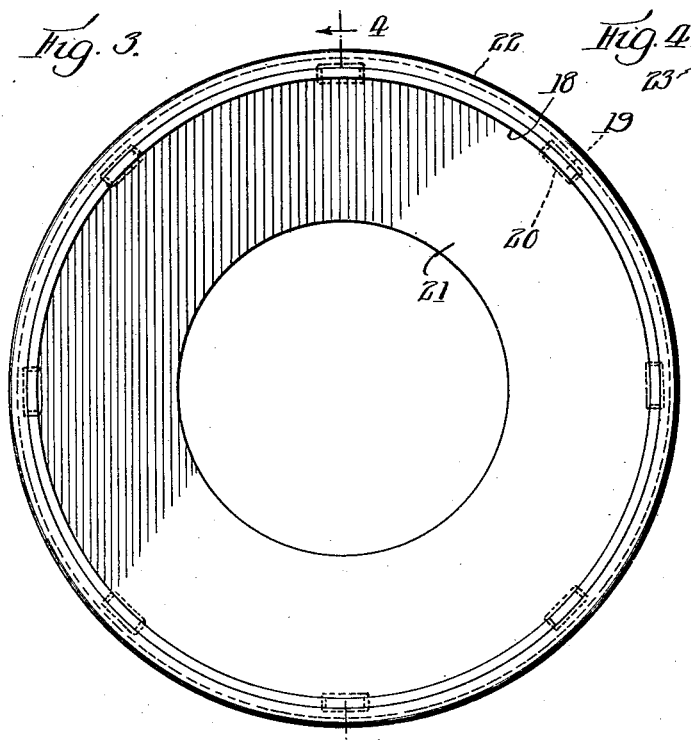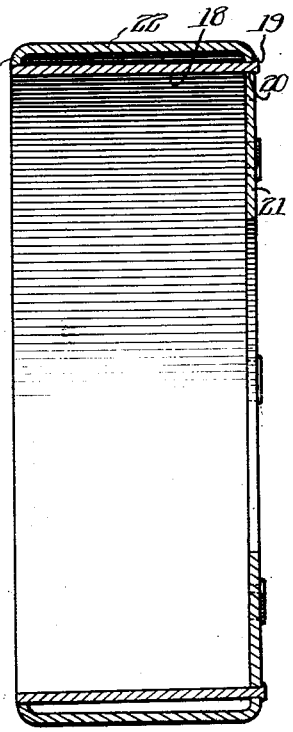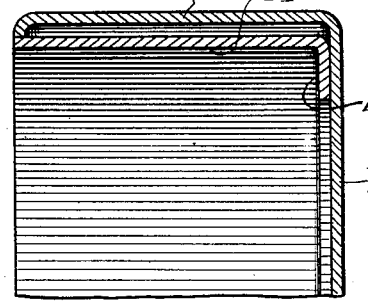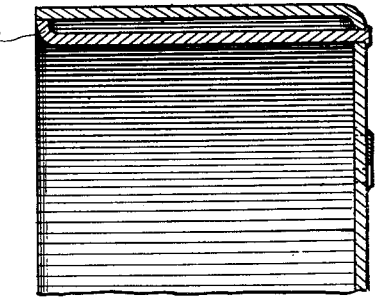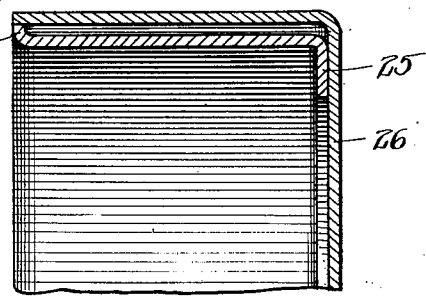

Patented Mar. 1, 1932

1,847,714

UNITED STATES PATENT OFFICE

HUGH GILLIES, OF DETROIT, MICHIGAN, ASSIGNOR TO AMERICAN BRAKE MATERIALS CORPORATION, OF NEW YORK, N. Y., A CORPORATION OF NEW YORK

BRAKE DRUM

Application filed February 11, 1929. Serial No. 338,966.

This invention relates to improvements in brake drums and one of its objects is to minimize as much as possible the expansion of the drum due to heat when brakes are applied which tends to distort the drum and render the application less efficient.

Another object of the invention is to permit economical use of a satisfactory metal for the wearing surface in the drum and thereby reduce wear, avoid cutting and prolong the life of the drum and the friction element.

And a further object is to provide a brake drum with an inner rim detachably secured within the outer rim and spaced from the outer rim so that it can be removed and replaced whenever desired.

In the accompanying drawings I have illustrated selected embodiments of the invention and referring thereto.

Fig. 1 is an elevation, partly in section, of a drum embodying the invention.

Fig. 2 is a sectional view on the line 2—2 of Fig. 1.

Fig. 3 is a side elevation of a drum showing another embodiment of the invention.

Fig. 4 is a sectional view on the line 4—4 of Fig. 3.

Figs. 5, 6 and 7 are detail sectional views showing other embodiments of the invention.

Referring to the drawings the drum comprises an outer rim 10 having, as usual, one side wall 11, and preferably provided with peripheral fins 12. An inner rim 13 is arranged within the outer rim 10 and is spaced concentrically from the outer rim by interior and integral lugs 14 on the outer rim. These lugs are spaced apart around the outer rim and they are bored and threaded at 15 to receive bolts 16' carrying washers 17 which overlap the outer rim and the inner rim and hold the inner rim securely within the outer rim. The outer rim may also be provided interiorly with annular fins 16 between the lugs 14. In this embodiment of the invention the inner rim is concentrically spaced from the outer rim by the integral lugs on the outer rim, and the inner rim is detachably but securely held within the outer rim by the bolts and washers.

In Figs. 3–7 the inner rims are permanently secured in place within the outer rims. The inner rim 18 of Figs. 3 and 4 is provided with projections 19 which extend through slots 20 in the side 21 of the outer rim 22 and are riveted to secure the projections in the openings and the inner rim within the outer rim. The free edge 23 of the outer rim 22 is turned inward to provide a spacing flange which engages the inner rim and spaces the inner rim from the outer rim. The slots 20 are so disposed in the side 21 that the inner rim will be spaced by the flange and by the walls of the openings concentrically within the outer rim.

In Fig. 5 the inner rim 24 is provided with an inturned annular flange 25 which is fastened to the side 26 of the outer rim 27 by spot welding or other suitable means. The construction of Fig. 6 is similar to that of Figs. 3 and 4 except that the spacing flange is formed on the inner rim at 28 to engage the outer rim; and the construction of Fig. 7 is similar to that of Fig. 5 except that the spacing flange 29 is formed on the inner rim to engage the outer rim.

My invention provides a brake drum of novel construction which permits the use of a higher grade of metal in the wearing surface of the drum to reduce the wear and prolong the life of the drum. It is intended that the inner rim shall be made of such metal or material as is best adapted for the service required and in the preferred form of my invention, Figs. 1 and 2, this inner rim is easily removable and replaceable. The outer rim may be made of soft steel which can be cold pressed. The rims are spaced apart to provide an air space therebetween and this space is open at one side of the drum between the lugs in Figs. 1 and 2. The outer rim of Figs. 2–7 may be provided with peripheral heat radiating fins if desired and with openings in the rims or in the flange for circulation of the air in the air space between the rims. I have illustrated the invention in simple embodiments but I reserve the right to make all such changes therein as may be found desirable within the scope of the following claims.

I claim:

1. A brake drum comprising an inner rim and an outer rim, the inner rim being spaced concentrically from the outer rim, and means at the sides of the rims securing the inner rim rigidly within the outer rim.

2. A brake drum comprising an inner rim and an outer rim, means on one of said rims spacing the inner rim concentrically from the outer rim, and means at the sides of the rims securing the inner rim rigidly within the outer rim.

3. A brake drum comprising an inner rim and an outer rim, the inner rim being spaced concentrically from the outer rim, and means at one side of the outer rim for securing the inner rim rigidly within the outer rim.

4. A brake drum comprising an inner rim and an outer rim, axially extending lugs on the outer rim spacing the inner rim concentrically from the outer rim, and means on the outer rim securing the inner rim rigidly within the outer rim.

5. A brake drum comprising an inner rim and an outer rim, axially extending spacing lugs between said rims holding the inner rim spaced concentrically from the outer rim, and means at the sides of the rims securing the inner rim rigidly within the outer rim.

6. A brake drum comprising an inner rim and an outer rim, integral axially extending lugs on the inside of the outer rim spacing the inner rim concentrically from the outer rim, and means engaged with said lugs for securing the inner rim rigidly within the outer rim.

7. A brake drum comprising an inner rim and an outer rim, the inner rim being spaced concentrically from the outer rim, bolts engaging the outer rim, and washers held by said bolts and overlapping the inner rim for securing the inner rim rigidly within the outer rim.

8. A brake drum comprising an inner and an outer rim, axially extending lugs on the outer rim spacing the inner rim concentrically from the outer rim, means for securing the inner rim rigidly within the outer rim, and circumferentially extending cooling fins on said outer rim, certain of said fins extending between said lugs on the inner periphery of said outer rim.

9. A brake drum comprising an inner rim and an outer rim, one of said rims having a flange at its open edge engaging the other rim for spacing the inner rim peripherally from the outer rim, and means for securing the rims together.

10. A brake drum comprising an inner rim and an outer rim, the inner rim being spaced peripherally from the outer rim, the outer rim having slots in its side and the inner rim having projections extending through said slots and securing the rims together.

HUGH GILLIES.